United States Patent [19]

Kitamura

[11] 4,442,576

[45] Apr. 17, 1984

[54] TOOL COOLING DEVICE FOR MACHINE TOOLS

[75] Inventor: Koichiro Kitamura, Takaoka, Japan

[73] Assignee: Kitamura Machinery Co., Ltd., Takaoka, Japan

[21] Appl. No.: 355,454

[22] Filed: Mar. 8, 1982

[30] Foreign Application Priority Data

Mar. 16, 1981 [JP] Japan .................... 56-37479

[51] Int. Cl.³ .................... B23B 9/00; B23B 51/06
[52] U.S. Cl. .................... 29/39; 29/DIG. 54; 29/DIG. 87; 82/DIG. 1; 408/56; 409/136
[58] Field of Search .............. 409/136; 408/56, 35, 408/57; 82/DIG. 1; 184/81; 29/39, DIG. 87, DIG. 54, DIG. 88

[56] References Cited

U.S. PATENT DOCUMENTS 2,834,376  5/1958  Hughes ................. 184/81 X
3,726,363  4/1973  Sussman ................ 408/56 X
4,164,879  8/1979  Martin ................. 409/136

FOREIGN PATENT DOCUMENTS 56-114645  9/1981  Japan ................ 409/136

Primary Examiner—William R. Briggs
Attorney, Agent, or Firm—Fleit, Jacobson, Cohn & Price

[57] ABSTRACT

The present invention relates to a tool cooling device for machine tools in which a plurality of cooling fluid distributing units are provided on a fixed shaft having a hole formed therethrough and communicating with a source of cooling fluid and each of the distributing units is connected preliminarily to one of the tools with oil holes which are accommodated in the tool magazine of a machine tool, whereby when selected one of the tools is engaged as such with the spindle, the cooling fluid is automatically supplied only to the tool engaged with the spindle.

1 Claim, 4 Drawing Figures

TOOL COOLING DEVICE FOR MACHINE TOOLS

BACKGROUND OF THE INVENTION

The present invention relates to a tool cooling device for machine tools, such as, NC milling machines of the type equipped with an automatic tool changer (hereinafter referred to as machining centers).

For instance, as is well known in the art, a machining center includes many different types of tools (cutters) accommodated in a tool magazine so that the desired tool is selected and changed automatically to machine a work, and a marked tendency to machine non-ferrous material such as aluminum or plastic material is seen lately. As a result, the machine tool is required to perform cutting at very high speeds with the resulting remarkable increase in the spindle speed and increase in the heating of tools. Therefore, the conventional practice of supplying a cutting oil to the outside of the tool cannot cool the tool satisfactorily with the resulting considerable deterioration of the tool cutting efficiency.

In an attempt to overcome these deficiencies, for example, recently a drill is formed with a hole in the lengthwise direction thereof (hereinafter referred to as an oil hole) so that a cooling fluid such as cutting oil is supplied into the oil hole thus cooling the tool and also forcibly removing the chip with the fluid pressure and thereby reducing the cutting resistance.

In order to supply the cooling fluid to the tool having such oil hole, the usual practice is to force the cooling fluid into the oil hole through a pipe having its one end connected to a cooling fluid pump and other end coupled to the tool holder. However, the tool magazine accommodates tools with oil holes and those having no oil hole as desired and in a suitable manner so that only when the tool having an oil hole is engaged with the spindle, the pipe is connected to the tool holder and the cooling fluid is supplied into the oil hole. In other words, there is a disadvantage that it takes a great deal of trouble and much time is required for making the necessary arrangements since the pipe must be connected or disconnected depending on the tool engaged with the spindle.

SUMMARY OF THE INVENTION

With a view to overcoming the foregoing deficiencies in the prior art, it is the object of this invention to provide a tool cooling device comprising a plurality of cooling fluid distributing units each preliminarily connected to one of the tools with oil holes which are accommodated in a tool magazine, whereby selected one of the tools is engaged as such with the spindle and a cooling fluid is supplied automatically only to the tool engaged with the spindle, thereby reducing the time required for making arrangements.

To accomplish the above object, in accordance with the present invention there is provided a tool cooling device for machine tools in which distributing unit means is provided by means of a fixed shaft having an axial hole communicated with a source of cooling fluid and a plurality of passages arranged at predetermined spaces to open to the axial hole and to the outer surface of the shaft in the same direction and a plurality of annular members rotatably mounted on the outer surface of the fixed shaft and each having a pipe fitting portion, whereby each of the annular member is connected with a pipe to one of a plurality of tools to be cooled which are accommodated at suitable spaces within a tool magazine and a cooling fluid is supplied to the tool by way of the axial hole formed through the fixed shaft.

DESCRIPTION OF THE PREFERRED EMBODIMENT

Figure 1:
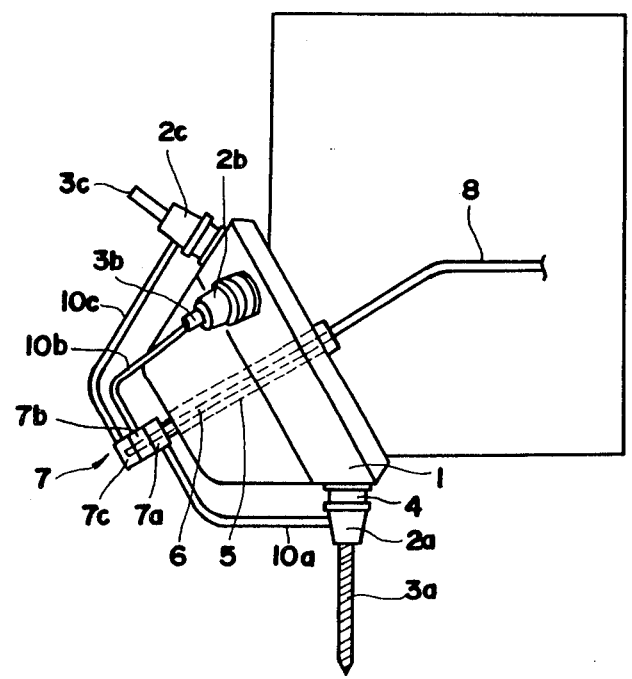
FIG. 1 is a side view of an embodiment according to the present invention.
Figure 2:
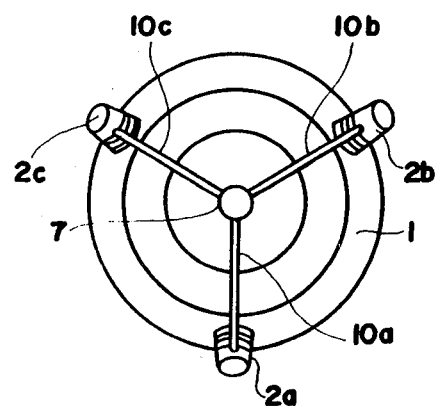
FIG. 2 is a front view showing the tool magazine section of FIG. 1.

Referring first to FIGS. 1 and 2, numeral 1 designates a tool magazine accommodating tool holders 2a, 2b and 2c respectively having tools 3a, 3b and 3c mounted thereon and mounted on a fixed shaft 5 by way of a bearing so as to be rotatable to the left and right about the fixed shaft 5. Numeral 6 designates a hole formed through the fixed shaft 5 in the axial direction thereof. In the Figures, those tools having no oil hole are not shown. Numeral 4 designates a spindle whereby the tool magazine 1 is rotated so that the desired tool is alinged with the center of the spindle 4 and then engaged therewith or alternatively the tool used previously is disengaged with the spindle 4 and then accommodated back into the tool magazine 1. Numeral 3a designates a drill with an oil hole which is engaged with the spindle 4 by way of the tool holder 2a and formed with an oil hole (not shown) extending in the lengthwise direction of its central portion.

Numeral 7 designates a distributor unit provided at the forward end of the fixed shaft 5 and having a hole communicating with the hole 6 of the fixed shaft 5 whose other end is connected via a pipe 8 to a cooling fluid distributor and a pump (which are not shown). The distributor unit 7 includes a plurality (only three are shown) of annular members 7a, 7b and 7c which are respectively connected to pipes 10a, 10b and 10c connected at the other end thereof to the tool holders 2a, 2b and 2c, respectively.

Figure 3:
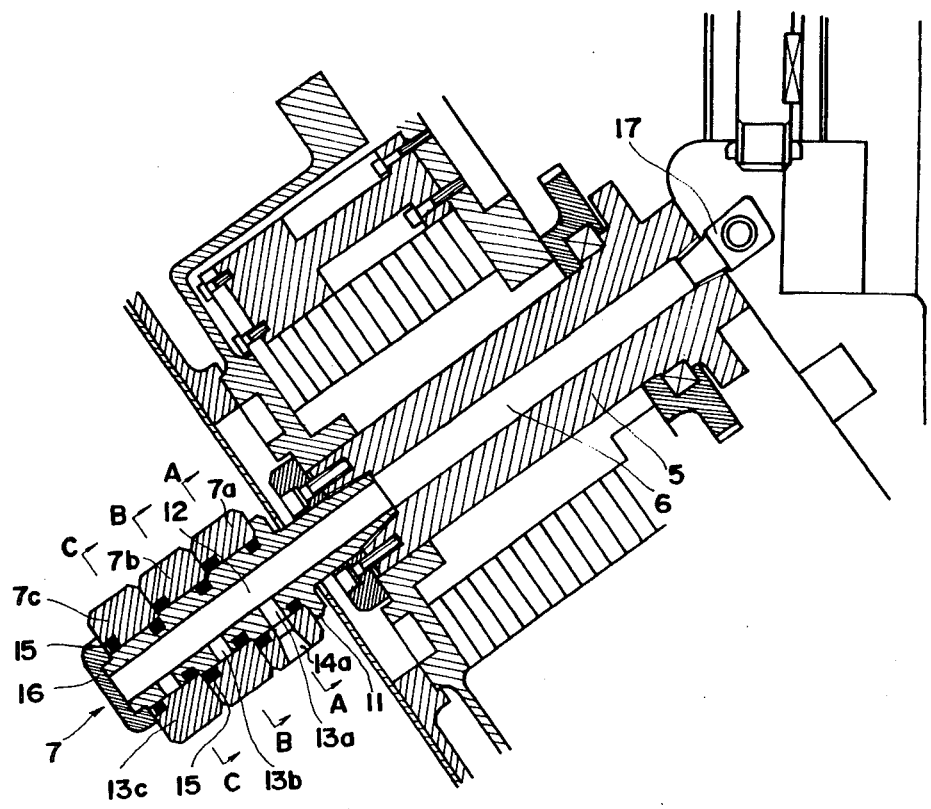
FIG. 3 is a longitudinal sectional view of the embodiment of the invention.

FIG. 3 shows a principle part of the embodiment of the invention. In the cooling unit 7, numeral 11 designates a shaft threadedly fitted in the end of the fixed shaft 5 and formed therethrough with a hole 12 communicating with the hole 6 of the fixed shaft 5. The hole 12 is formed with passages 13a, 13b and 13c which are arranged at predetermined spaces and opened to the outer surface on the same direction. The annular members 7a, 7b and 7c are rotatably mounted on the shaft 11 by way of O-rings 15 and they are provided with pipe fitting portions 14a, 14b and 14c for connection with the pipes 10a, 10b and 10c (see FIG. 1). The pipe fitting portions 14b and 14c of the annular members 7b and 7c are not shown. Numeral 16 designates a cap provided at the forward end of the shaft 11, and 17 a cock threadedly fitted in the hole 6 and connected from the cooling fluid distributor to the pump by way of the pipe 8.

With the machining center equipped with the cooling device constructed as described above, the tool holders 2a, 2b and 2c having mounted thereon the oil hole finished tools 3a, 3b and 3c are accommodated at substantially the equal spaces in the tool magazine 1. For example, where the number of tools is 3, the tools are arranged substantially at 120° spacing as shown in FIG. 2. In this case, the annular members 7a, 7b and 7c of the distributor unit 7 are respectively connected to the tool holders 2a, 2b and 2c by the pipes 10a, 10b and 10c (see FIGS. 1 and 2). Assuming now that the tool magazine 1 is rotated so as to engage the oil hole furnished tool 3a with the spindle 4, the annular member 7a connected to the tool holder 2a of the drill 3a by way of the pipe 10a as shown in FIG. 1 is also rotated so that when the tool holder 2a is engaged with the spindle 4, the pipe fitting portion 14a of the annular member 7a is now brought into engagement with the passage 13a of the shaft 11 as shown in (a) of FIG. 4.

Figure 4:
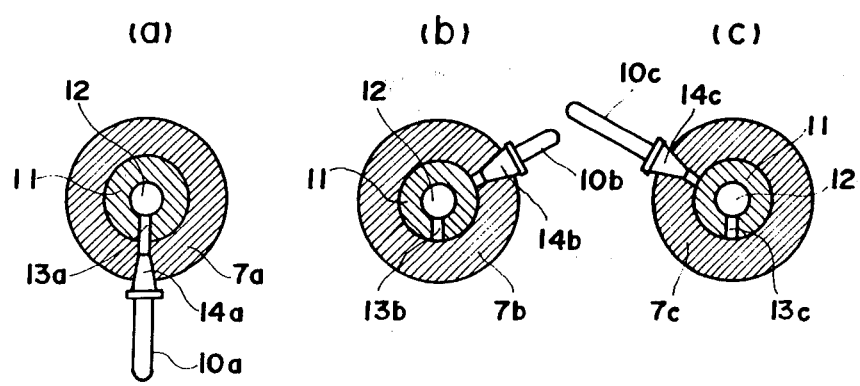
FIGS. 4(a), (b) and (c) are sectional views respectively taken along the lines A—A, B—B and C—C of FIG. 3, which are useful for explaining the operation of the distributing units according to the invention.

At this time, the pipe fitting portions 14b and 14c of the annular members 7b and 7c are respectively positioned about 120° apart from the pipe fitting portion 14a of the annular member 7a as shown in (b) and (c) of FIG. 4 and thus the pipe fitting holes 14b and 14c are closed by the shaft 11. In this condition, the cooling fluid is supplied under pressure from the pump so that the cooling fluid is supplied to the tool holder 2a from the pipe 10a via the pipe 8, the cock 17, the holes 6 and 12 and the passage 13a and the drill 3a is cooled. In this case, the cooling fluid is not supplied to the tool holders 2b and 2c.

When the tool 3b or 3c is engaged with the spindle 4, the cooling fluid is supplied in the similar manner and the tool 3b or 3c is cooled. When a tool having no oil hole is engaged with the spindle 4, the cooling fluid is not supplied to the tool since the passages 13a, 13b and 13c formed in the shaft 11 are all closed by the annular members 7a, 7b and 7c.

While, in the embodiment described above, the distributor unit is provided with the three annular members, the present invention is not intended to be limited to it and it is possible to provide one or a number of annular members and arrange the corresponding number of tools with oil holes in the tool magazine so far as only selected one of the passages is communicated with the associated pipe connecting portion. Further, while, in the above-described embodiment, the tools with oil holes are arranged at substantially the equal spaces in the tool magazine, the spacing may be selected as desired so far as only selected one of the passages is connected to the associated pipe connecting portion. Still further, while the shaft forming a part of the distributor unit is formed with the hole therethrough and the forward end is closed by the cap, the hole may be replaced with a blind hole thereby eliminating the cap.

Still further, while the present invention has been described as applied to the cooling of the tools of a machining center, the present invention is not intended to be limited thereto and the invention can be applied for example to any other machine tools such as turret lathes equipped with a plurality of cutting tools.

In accordance with the present invention, as having been described in detail, when any one of the tools with oil holes is engaged with the spindle, the cooling fluid is automatically supplied to the tool without requiring any operation with the resulting great decrease in the time required for making arrangements. This in turn results in an improved operating efficiency.

What is claimed is:

1. A tool cooling device for machine tools said device comprising:

distributing unit means provided with a fixed shaft and a plurality of annular members rotatably mounted on the outer surface of said fixed shaft and each having a pipe fitting portion, said fixed shaft including a hole formed therethrough in the axial direction thereof and a plurality of passages arranged at predetermined spaces and opening to said axial hole and to the outer surface of said fixed shaft in the same direction, and each of said annular members is connected with a pipe at said pipe fitting portion to one of a plurality of tools requiring cooling and accommodated at suitable spaces in a tool magazine, and said pipe fitting portions of each said annular member is aligned communicating with only one of said plurality of passages whereby said tools are automatically and selectively supplied with a cooling fluid through said axial hole formed through said fixed shaft upon placement of said tools in a work position.

* * * * *